United States Patent [19]

Anafi et al.

[11] Patent Number: 4,996,412

[45] Date of Patent: Feb. 26, 1991

[54] OPTICAL SYSTEM FOR WAVEFRONT COMPENSATION

[75] Inventors: David Anafi; John H. Mitchell, both of West Palm Beach; Harold B. Schall, Palm Beach Gardens, all of Fla.

[73] Assignee: United Technologies Corporation, Hartford, Conn.

[21] Appl. No.: 447,317

[22] Filed: Dec. 7, 1989

[51] Int. Cl.$^5$ .............................................. G01J 1/20
[52] U.S. Cl. ................................... 250/201.9; 356/353
[58] Field of Search .................... 250/201.9; 356/353, 356/354, 359; 330/4.3; 332/7.51

[56] References Cited

U.S. PATENT DOCUMENTS 4,684,796  8/1987  Johnson ........................... 250/201.9

Primary Examiner—David C. Nelms

[57] ABSTRACT

A laser wavefront control system employs a common optical path and common high-power deformable mirror to optically compensate an incoming beacon or retroreflected return beam and a laser sample beam, in which the phase conjugate of the laser sample beam is impressed on a low-power deformable mirror. This control system drives the high-power deformable mirror, and has as its input the phase modulation required for compensation of optically sensed wavefront phase errors.

5 Claims, 4 Drawing Sheets

OPTICAL SYSTEM FOR WAVEFRONT COMPENSATION

TECHNICAL FIELD

The field of the invention is that of adaptive optics, in particular, the control of an optical beam train in a laser system.

BACKGROUND ART

In the art of compensating a beam it is necessary to compensate for phase variations within the laser generating the beam and also for distortion within the atmosphere through which the beam propagates. It is conventional to use two deformable mirrors in the path of the laser beam. One deformable mirror adjusts to compensate the phase errors resulting from propagation through the beamtrain—from the laser source to the sampling optic via utilization of a wavefront sensor-reconstructor combination. A beam from a beacon is sampled and directed to a second wavefront measuring system coupled to a controller and a second deformable mirror. A well known draw back of these systems is that the two beams do not travel the same path and so the compensation can never be fully complete. Further, both deformable mirrors must be capable of withstanding the relatively high power laser beam and are thus more expensive than more conventional low-power optics. FIG. 2 shows a conventional system, in which two separate deformable mirrors and two separate wavefront measuring systems are used. As can be seen, there is no path that is common to both of the wavefront systems.

DISCLOSURE OF INVENTION

The invention relates to an adaptive optics system for beam control, in which a single high power deformable mirror is used; and in which two wavefront measuring systems share a common path. A sample beam from a laser is phase conjugated and directed collinearly with a sample return beam from a beacon or target to a low power deformable mirror that reflects both beams into respective wavefront measuring systems. A first wavefront measuring system controls the low power deformable mirror to impress on the deformable mirror the correction for the conjugate of the laser beam, which is a map of the errors in the phase front of the laser beam. The second wavefront measuring system sees a sample return beam containing perturbations from the atmosphere and the downstream optics, on which is impressed the errors of the laser source and the upstream beamtrain components. This second wavefront system therefore corrects for the return beam errors which include atmospherically induced wavefront perturbations and those phase errors induced by beamtrain components downstream of the sampling optics as well as those impressed by the low power deformable mirror. This second wavefront system requires only one deformable mirror in the optical train.

Other features and advantages will be apparent from the accompanying drawings which illustrate an embodiment of the invention.

BEST MODE FOR CARRYING OUT THE INVENTION

Figure 1:
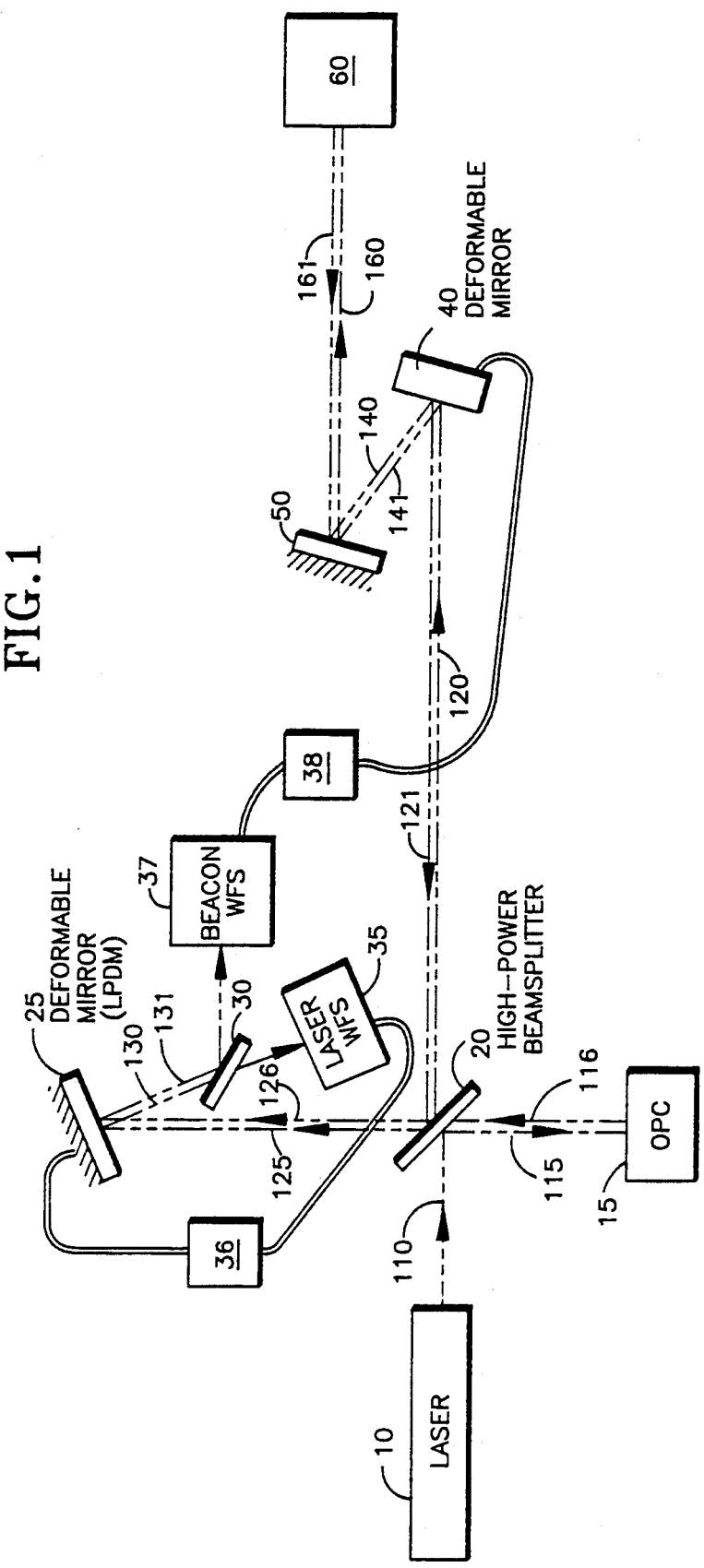
FIG. 1 illustrates a system according to the invention.

Referring now to FIG. 1, there is shown, in partially pictorial, partially schematic form, an embodiment of the invention.

A laser 10 on the left side of the Figure generates a beam 110 traveling to the right. This beam strikes a beam splitter 20, which reflects a small portion of it as a sample beam downward towards optical phase conjugator 15 which will be described below. Beam splitter 20 is a conventional beam splitter used in the art, such as a large fused silica Brewster window, and is positioned very near Brewster's angle with respect to beam 110. The sample beam travels downwardly towards phase conjugator 15 as beam 115. The phase conjugated beam travels upwardly, collinear with beam 115 and oppositely directed, as beam 116; passes through beam splitter 20; continues upward as beam 125 to strike deformable mirror 25. This beam 125 traveling upward is then modified by having a phase pattern impressed upon it from the configuration of the surface of mirror 25. This altered beam, now referred to as 130, travels downwardly and transmits through beam splitter 30 into wavefront sensor 35. In the illustrated embodiment, laser 10 is pulsed and sensors 35 and 37 are controlled by conventional control means not shown to respond at the correct time. Wavefront sensor 35, a conventional reconstructor/controller/wavefront sensor combination such as is described in Schmutz, et al "Integrated Imaging Irradiance ($I^3$) sensor: a new method for real-time wavefront mensuration," SPIE Vol. 179, Adaptive Optical Components, pp. 76–80 (1979); and Parenti, R., "Recent Advances in Adaptive Optics Methods and Technology," SPIE Vol. 1000, Laser Wavefront Control, pp 101–109, (1988), measures the slope of the phase front of beam 130 and passes signals to mirror reconstructor/controller 36. Controller 36 adjusts the front surface of deformable mirror 25, as is known in the art, to impress on it a pattern that restores the phase front or phase error on beam 130 to zero. This conventional nulling technique provides for compensation of beam 130. Since only a small amount of power is deflected into sample beam 115, deformable mirror 25 can be much less expensive than a comparable deformable mirror that is required to withstand the total power of laser 10.

Referring now to source 60 on the right of FIG. 1, this source may be a beacon generating a beam or a target or retroreflector which reflects a return beam back from the laser beam hitting it. For convenience, it will be referred to as an incoming beam or as a return beam whether it is a portion of the laser beam that is returned or a new beam from source 60. This return beam 161 enters the system, strikes turning mirror 50 and passes to high power deformable mirror 40 as beam 141. This beam is modulated by a pattern impressed on it, as will be described below, and travels to the left as beam 121. Beam 121 is deflected off the right surface of beam splitter 20 upwardly as beam 126. The system is aligned such that beams 125 and 126 are essentially collinear. They both strike deformable mirror 25 and are modulated with the same pattern impressed upon that mirror by reconstructor/controller 36. The return beam, or incoming beam as it will be referred to, is transformed by mirror 25 into beam 131 which is reflected from the front surface of beam splitter 30 into a wavefront sensor 37, that measures distortions in that modulated incoming beam. Wavefront sensor 37 controls high power deformable mirror 40 to impress upon it an appropriate phase modulation pattern.

It will be evident to those skilled in the art that the two beams travel together and share a common path from the surface of beam splitter 20 to the surface of beam splitter 30. It is a further feature of the invention that the low power deformable mirror is located on this common path. Sample beam 115 is deflected downwardly off the front surface of beam splitter 20 towards phase conjugator 15. Conventionally in this document, the surface on the left will be referred to as surface 1 and the surface on the right will be referred to as surface 2, the reference is the direction in which laser beam 110 is traveling. The beam 115 contains in it errors or phase differences from laser 10 together with further phase aberrations and errors coming from beamtrain propagation to surface 1 on beam splitter 20, internal reflection off surface 2 of beam splitter 20, transmission through another portion of surface 1 on beam splitter 20, and bulk effects of the beamsplitter material. Because of the properties of optical phase conjugation, beam 116 is the phase conjugate of beam 115, which, passing back upwardly through beam splitter 20, cancels out several of the errors introduced by beam splitter 20 on sample beam 115.

The partially corrected sample beam travels upwardly as beam 125 and is further modulated by mirror 25 under control of reconstructor/controller 36. Wavefront sensor 35 sees a beam containing the conjugate of the upstream beamtrain phase errors, plus partially corrected errors from beam splitter 20. The amplitude and phase of beam 110 at the front surface of beam spitter 20 are represented in expression 1

$$A_L \exp(-j\Phi_L) \quad (1)$$

having an amplitude A and an exponential representing the phase aberrations with $\Phi_L$ represents the phase errors coming from the high energy laser and all upstream beam components. The corresponding expression for the amplitude and phase at the entrance to phase conjugator 15 is shown as expression 2.

$$A_L \exp[-j(\Phi_L + \Phi_{s1t} + \Phi_{B1} + \Phi_{s2Ri} + \Phi_{B2} + \Phi_{s3t})] \quad (2)$$

The other terms in this expression represent induced phase errors, respectively, from front transmission through the first surface of beam splitter 20, passage through the bulk of the beam splitter, internal reflection off the second surface, further passage through the bulk and transmission through a different portion of the first surface. The notation is that S represents a surface, R and t represent reflection and transmission and i and e represent internal and external reflection. The amplitude and phase of the beam traveling upwards as beam 116 are shown in expression 3

$$A_L \exp[+j(\Phi_L + \Phi_{s1t} + \Phi_{B1} + \Phi_{s2Ri} + \Phi_{B2} + \Phi_{s3t})] \quad (3)$$

in which the phase conjugate of the corresponding expression on beam 115 is represented. Note that $A_L$ has changed to $A^*_L$, representing the complex conjugate, and the exponent has changed sign. The expression for beam 125 is shown in expression 4, $$A^*_L \exp[+j(\Phi_L + \Phi_{s1t} + \Phi_{B1} + \Phi_{s2Ri} + \quad (4)$$
$$\Phi_{B2} + \Phi_{s3t} - \Phi_{s3t} - \Phi_{B2} - \Phi_{s2t})] =$$
$$A^*_L \exp[+j(\Phi_L + \Phi_{s1t} + \Phi_{B1} + \Phi_{s2Ri} + \Phi_{s2t}]$$

in which it is noted that several of the terms coming from beam splitter 20 have cancelled out. This cancellation of phase errors by complex conjugation is referred to in "Nonlinear optical phase conjugation" by D. M. Pepper in *Optical Engineering*, March 1982, Vol. 21, No. 2.

The phase modulation impressed on beam 125 by mirror 25 is shown as expression 5.

$$\exp[-j(\Phi_L + \Phi_{s1t} + \Phi_{B1} + \Phi_{s2Ri} - \Phi_{s2t})] \quad (5)$$

It should be noted that this is just the complex conjugate of the phase of incoming beam 125 because this phase pattern results from the nulling effect of the controlling laser wavefront sensor 35, cancelling the phase perturbation of expression 4, and subject to control of the reconstructor/controller 36. Thus, the phase pattern impressed on beam 126 will also be given by expression 5.

Referring now to the second surface of beam splitter 20 and the approaching incoming beam at that surface, expression 6 illustrates a second amplitude $A_{BEACON}$ and a phase factor having two terms, $\phi_{BEACON}$ and $\phi_{HPDM}$, which represents the phase impressed on beam 161 by deformable mirror 40.

$$A_{BEACON} \exp[-j(\Phi_{BEACON} + \Phi_{HPDMs})] \quad (6)$$

The amplitude and phase of beam 126 is indicated in expression 7

$$A_{BEACON} \exp[-j(\Phi_{BEACON} + \Phi_{HPDMs} - \Phi_{S2Re})] \quad (7)$$

with an additional term coming from external reflection off the second surface of beam splitter 20. Since sensor 37 and controller 38 serve to null the phase error in beam 131 by control of mirror 40, the next expression, 8, $$A_{BEACON} \exp[-j$$
$$(\Phi_{BEACON} - \Phi_{S2Re} + \Phi_L + \Phi_{s1t} + \Phi_{B1} + \Phi_{S2Ri} - \Phi_{S2t})] \quad (8)$$

represents the amplitude and phase of beam 31 without the term coming from mirror 40. This expression is the product of the incoming amplitude and phase of beam 126 with the phase impressed on beam 126 by mirror 25.

It is now convenient to refer to the phase on laser beam 120 traveling to the right and coming towards deformable mirror 40. This has the phase represented by expression 9

$$A_L \exp[-j(\Phi_L + \Phi_{S1t} + \Phi_{B1} + \Phi_{S2t})] \quad (9)$$

which consists of the errors from upstream of beamsplitter 20 plus the aberrations coming from the first and second surfaces and bulk of beam splitter 20. The phase impressed on beam 120 by deformable mirror 40 is that necessary to cancel expression 8, since sensor 37 and controller 38 are set to drive the phase errors of expression 8 to zero. Remember expression 8 left out the phase term of mirror 40, which, as a result of the closed loop system, will cancel the phase factor in expression 8. The phase impressed on deformable mirror 40 is set out in expression 10.

$$\exp[-j(\Phi_{BEACON}-\Phi_{S2Re}+\Phi_L+\Phi_{S1t}+\Phi_{B1}+\Phi_{S2Ri}-\Phi_{S2t})] \quad (10)$$

The phase of outgoing beam 140 is thus the product of expression 9 and 10, i.e., the phase of outgoing beam 120 modulated by the complex conjugate of the phase entering the sensor 37. Cancelling out terms within this expression, gives a simplified expression 11, which has the amplitude of the laser with the negative of the phase coming from the atmospheric aberrations and three other terms.

$$A_L[-j(2\Phi_{S2t}-\Phi_{BEACON}+\Phi_{S2Re}-\Phi_{S2Ri})] \quad (11)$$

Figure 5:
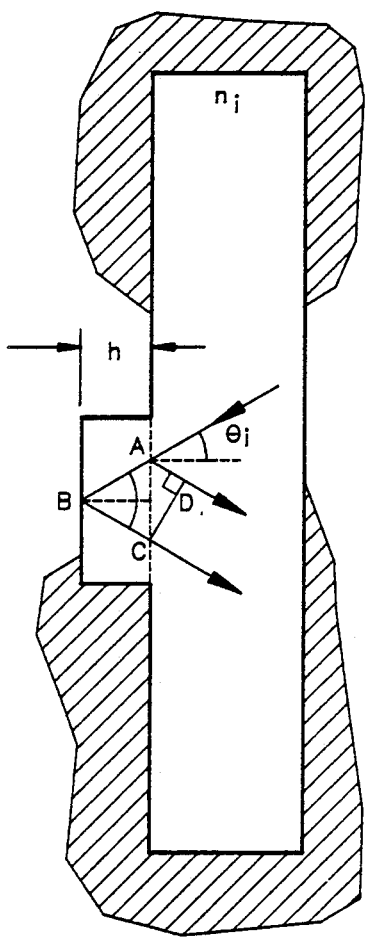
FIG. 5 illustrates a calculation of optical path difference used in carrying out the invention.

Referring now to FIG. 5, there is shown a calculation of the optical path difference and the phase shift from an internal reflection within a beam splitter or other object caused by a small irregularity in the surface denoted by h. The optical path difference is $2n_i h \cos\Theta$, where $n_i$ is the index of refraction of the material.

Figure 6:
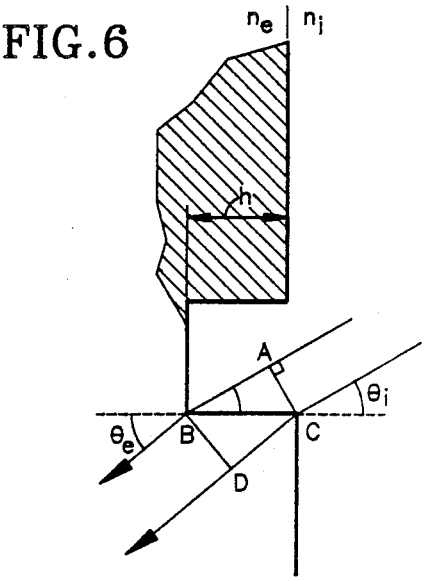
FIG. 6 illustrates another calculation of optical path difference used in carrying out the invention.

Referring now to FIG. 6, there is a corresponding calculation of the phase shift caused by transmission through a boundary and containing an irregularity of height h. The optical path difference here is $h(n_1\cos\Theta - n_e\cos\Theta)$. Combining the results of the calculations of FIGS. 5 and 6, it will readily be seen by those skilled in the art that the term $\Phi_{S2t}$ cancels out the two terms $\Phi_{S2Re}$ and $\Phi_{S2Ri}$ i.e., that the phase aberration caused in double-pass second surface transmission cancels out corresponding phase aberrations caused by the internal and external reflections. This makes intuitive sense, in that transmission through a surface involves passing through the same area as internal and external reflection at the same point. The final result is that all phase errors induced by the beamtrain components are compensated, as well as the primary compensation of the aberrations inherent from the laser source, such that the remaining perturbation on outgoing beam 160 is the inverse of the phase errors caused by the atmosphere. Propagation through the atmosphere in the opposite direction will now compensate the atmospheric perturbations. The beam traveling to the right in FIG. 1 will be as nearly as possible fully compensated when it reaches the vicinity of beacon 60. This advantageous result is a combination of the use of a common path for a single mirror modulating both the laser beam and the return beam and the use of optical phase conjugation to both cancel out the effect of the bulk material and surfaces of beam splitter 20 and also to impress on incoming beam 131 just the amount of phase modification required to be impressed on deformable mirror 40. Essentially, the modulations required to correct laser beam 110 have been transferred to deformable mirror 40 by means of the loop controlling low power mirror 25 and the use of the common path.

Figure 2:
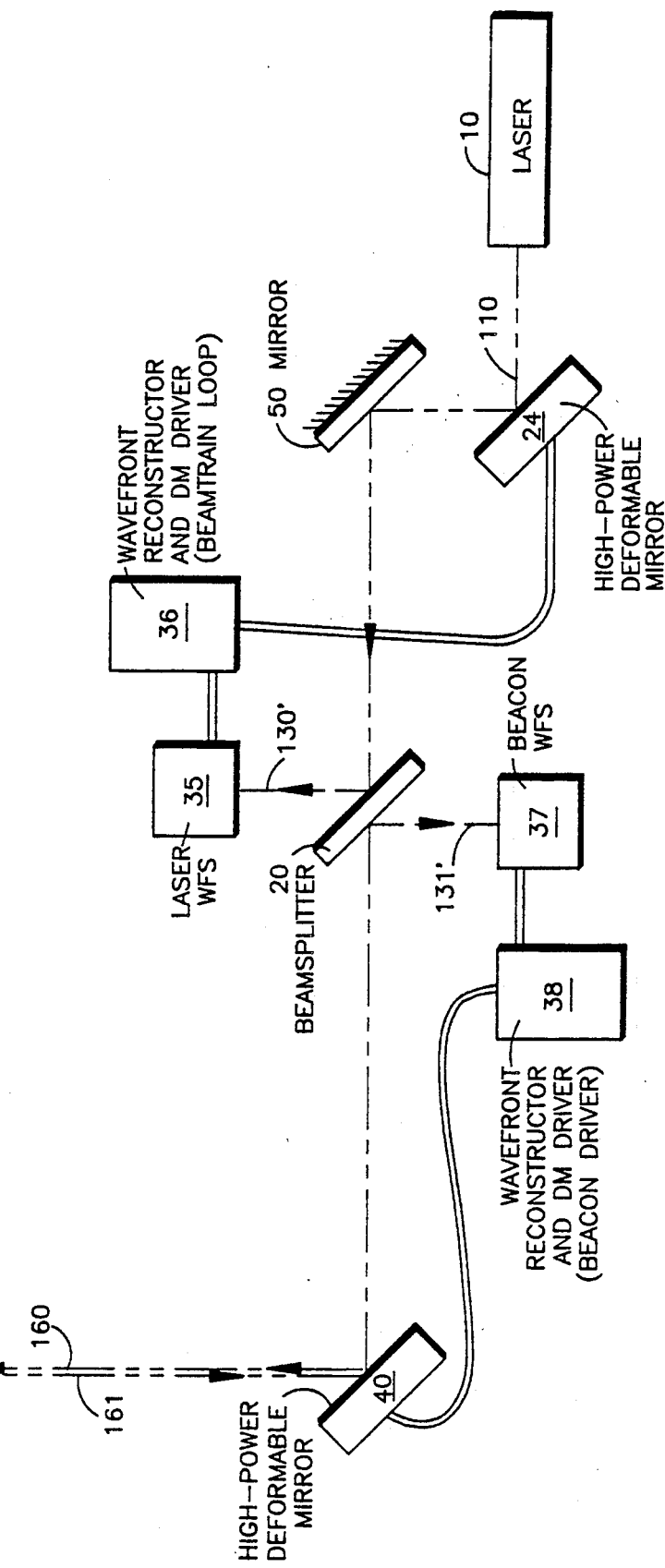
FIG. 2 illustrates a prior art system.

In contrast, referring now to FIG. 2, where corresponding elements have the same number, the prior art laser beam comes from the right passing through a first deformable mirror 24, which is controlled by a sensor 35 responding to a sample beam 130'. Beam 130' is referred to with a prime, since it is not the phase conjugate of the same beam as is the case in FIG. 1. On the other side of the drawing, incoming beam 161 is modulated by mirror 40 under control of sensors 37 and controller 38. It will be evident that these two loop control system have non-common paths.

Figure 3:
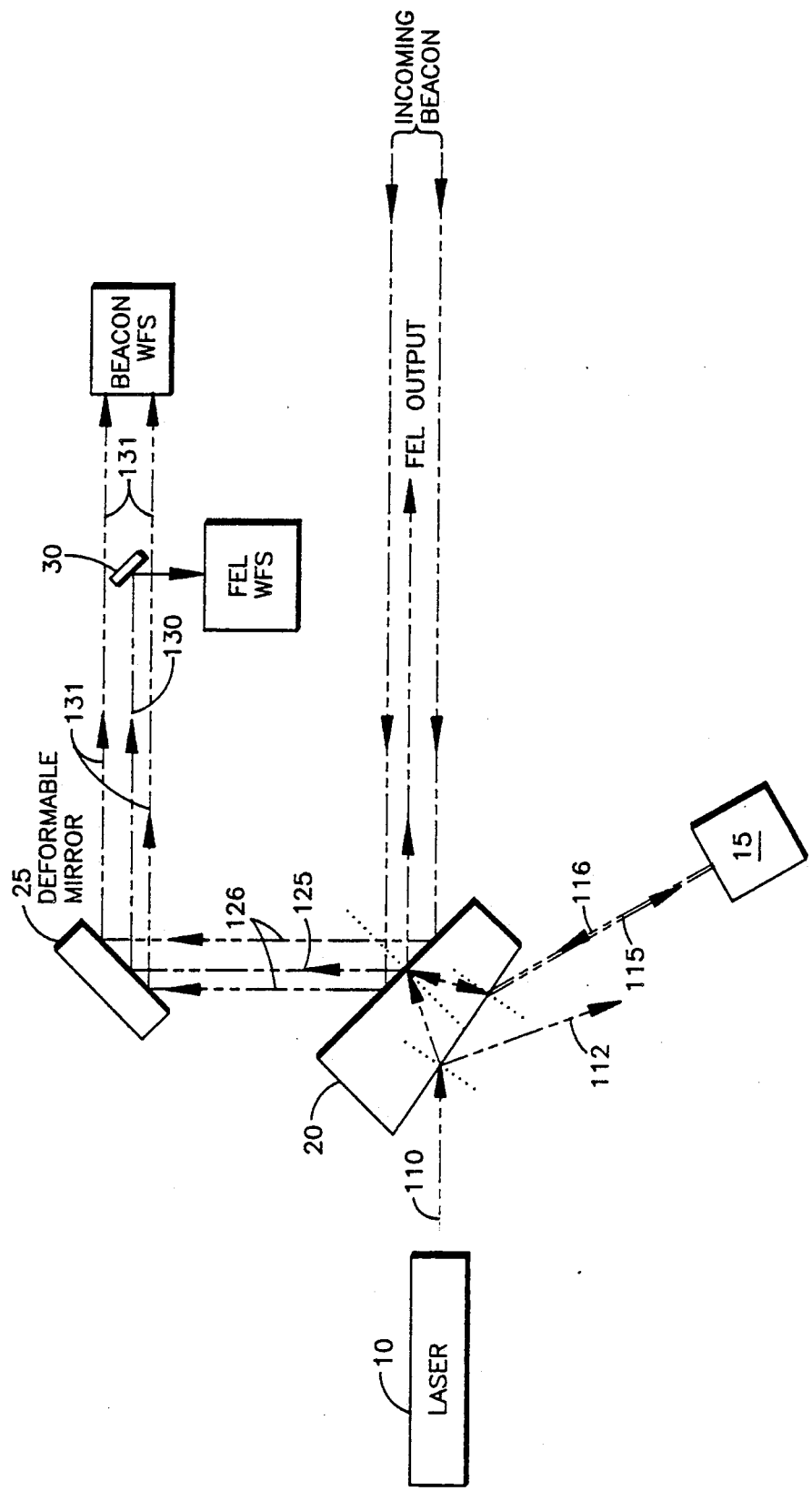
FIG. 3 illustrates one type of phase conjugator used with the invention.

Referring now to FIG. 3, there is shown one version of the optical phase conjugator 15 of FIG. 1. Beam splitter 20 has been shown as greatly enlarged and exaggerated in order to clarify the drawing. Laser beam 110 enters from the left, passes through the front surface of the beam splitter 20 with a fraction being deflected off as sample beam 112, which is not used in this embodiment. The remainder passes through the bulk material and out as beam 120. A sample beam is reflected off by internal reflection downwardly in the drawing and back to the front surface again as beam 115. Beam 115 strikes an optical phase conjugator 15 which is illustratively a liquid such as, carbon tetrachloride, which is subject to stimulated Brillouin scattering (SBS), known to those in the art, which returns a phase conjugated beam 116 as described above. The advantage of this is that the beam quality of a laser 110 will, in general, not be good and there will be very sizable power fluctuations. This type of phase conjugator is especially resistant to high powers as is illustrated in Table 1.

TABLE I

| OPC | (nm) | % R | W/cm² | Material |
|---|---|---|---|---|
| SBS | 106 | | 4K–200K | acetone, CCl4, SF methane, CS2 |
| SBS | 694 | | 2.5 M | methane |
| SBS | 532 | 160 | 2.5–10 M | acetone |
| SBS | 694 | 70 | 1.5 M | CS2 |
| SBS | 1060 | 70 | 1.5 M | CCl4 |
| SBS | | | | CCl4 |
| SBS | 694 | | 28 M | CS2 |
| SBS | 10600 | | 21 KW | germanium |
| | | | 1.4 KW | GaAs |
| | | | 85 KW | KES-5 |
| | | | 125 KW | KRS-6 |
| | | | 125 KW | ZnSe |
| | | | 165 | TiGaSe2 |
| SBS | 694 | | 30 MW | CS2 |
| | | | 1200 MW | benzene |
| SBS | 694 | | 3.9 MW | C6H14 |
| | | | 5.0 MW | C6H12 |
| | | | 4.5 MW | (C2H5)2 O |
| | | | 5.2 MW | CCl4 |
| | | | 6.0 MW | C2H5OH |
| | | | 4.9 MW | C3H6O |
| | | | 5.0 MW | CH3OH |
| | | | 12.3 MW | H2O |
| | | | 2.9 MW | C6H5CH3 |
| | | | 3.8 MW | C6H6 |
| | | | 3.8 MW | C6H5NO2 |
| | | | 1.4 MW | CS2 |
| DFWM | 1060 | 85 | 10 MW | Silicon |
| DFWM | 1060 | 180 | 6.8 MW | Silicon |
| DFWM | 1060 | 600 | 340 MW | BDN(dye) |
| DFWM | 532 | | 1 MW | CS2 |

Figure 4:
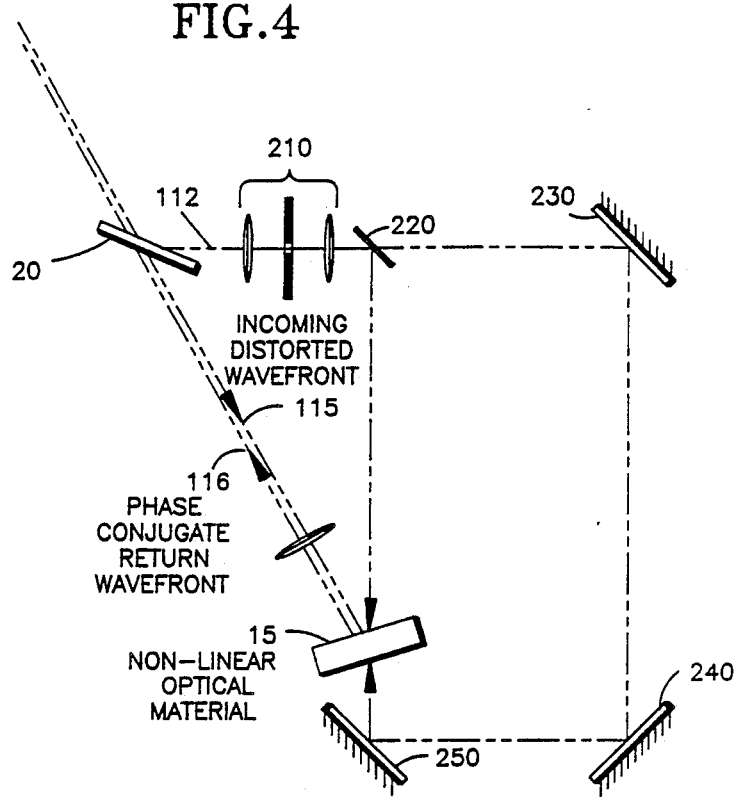
FIG. 4 illustrates a second type of phase conjugator used with the invention.

An alternative form of the phase conjugator which will withstand less power than that of FIG. 3 but still a considerable amount is illustrated in FIG. 4. There, the beam splitter 20 is shown schematically with beam 112 being deflected to the right in the drawing and beam 115 being deflected downwardly. This is a schematic drawing and those skilled in the art will readily be able to translate this into conventional optical elements with appropriate turning mirrors. Spatial filter 210 cleans up the beam and deflects two beams 220 and 230. Beam 230 is reflected around through mirrors 240 and 250 to form a second pump beam of a degenerate four way mixing system. The material 15 is any the conventional material from Table 1. As is well known, the DFWM process produces a phase conjugate beam 116 traveling antiparallel to incoming beam 115 as described above.

It is not necessary for the practice of the invention in its broadest sense that the beam sampling element be the beamsplitter shown here, though that is the preferred embodiment. If desired, the sample beams could be produced by etching sampling gratings in any of the beam mirrors, then transporting the sample beam to a phase conjugate mirror, and then combining the two sample beams to reflect off mirror 125 as before.

It should be understood that the invention is not limited to the particular embodiments shown and described herein, but that various changes and modifications may be made without departing from the spirit and scope of this novel concept as defined by the following claims.

We claim:

1. An optical system for controlling an optical beam train that transports a laser beam from a laser and directs said laser beam through the atmosphere at a target, comprising a first deformable mirror, disposed along a sample beam path of a first sample beam from said laser beam, for modifying said first sample beam, a laser beam sensor disposed to receive said first sample beam after reflection from said first deformable mirror, for detecting a phase front representative of said laser beam, an incoming beam sensor for detecting a phase front representative of an incoming beam entering said optical system after passage through the atmosphere, laser beam control means coupled to said laser beam sensor and to said first deformable mirror for controlling said first deformable mirror to compensate for errors in said phase front of said laser beam, and incoming beam control means coupled to said incoming beam sensor and to a second deformable mirror for controlling said second deformable mirror to compensate said laser beam for perturbations in the atmosphere;

in which optical system, beam sampling means for deflecting said first sample beam from said laser beam and a second sample beam from said incoming beam combine to direct both said first and said second sample beams on said first deformable mirror and thence to said laser beam sensor and said incoming beam sensor respectively, whereby said laser beam sensor and said incoming beam sensor both detect radiation reflected from and modulated by said first deformable mirror; and said laser beam control means adjusts said first deformable mirror to compensate for errors in said laser beam, thereby impressing a compensating configuration on said first deformable mirror and a corresponding modulation on said second sample beam, so that said incoming beam control means controls said second deformable mirror in response to both said second sample beam and to said corresponding modulation.

2. An optical system according to claim 1, in which said beam sampling means for deflecting said first and said second sample beams comprises a beam sampling element for forming said first sample beam and directing said first sample beam into a phase conjugate mirror, whereby said phase conjugate mirror generates a modified first sample beam having a phase conjugate wavefront;

in which said beam sampling means further includes means for directing said first sample beam with said first phase conjugate wavefront collinearly with said second sample beam on to said first deformable mirror, whereby said laser beam sensor and said laser beam control means combine to impress said compensating configuration on said first deformable mirror to produce said corresponding modulation of said second sample beam that is substantially representative of the phase conjugate wavefront of said laser beam; and in which said incoming beam control means controls said second deformable mirror in response to said second sample beam to impress both corrections to the phase front of said incoming beam and said corresponding modulation, whereby said second deformable mirror corrects both phase errors in said incoming beam and phase errors in said laser beam.

3. An optical system according to claim 2, in which said beam sampling means comprises a substantially transparent sampling element disposed in said laser beam and having a first surface oriented toward said laser and an opposite second surface, and in which said first sample beam is reflected off said first surface into said phase conjugate mirror and then reflected back through said first surface and said second surface at a sample beam point on said second surface toward said first deformable mirror, whereby phase errors induced by said first surface and by the bulk properties of said beam sampling element are compensated by said phase conjugate wavefront of said modified first sample beam, and said second sample beam is reflected off said second surface.

4. An optical system according to claim 3, in which said phase conjugate mirror comprises a fluid having the property of stimulated Brillouin scattering in response to radiation incident thereon.

5. An optical system according to claim 3, in which said phase conjugate mirror comprises an optical system for generating a reflected sample beam by the degenerate four-wave mixing process.

* * * * *

UNITED STATES PATENT AND TRADEMARK OFFICE
CERTIFICATE OF CORRECTION

PATENT NO. : 4,996,412

DATED : February 26, 1991

INVENTOR(S) : David Anafi, John H. Mitchell and Harold B. Schall

It is certified that error appears in the above-identified patent and that said Letters Patent is hereby corrected as shown below:

At column 1, between the title and the heading "TECHNICAL FIELD", insert the following:

--The Government has rights in this invention pursuant to Contract No. DASG60-88-C-0015 awarded by the Department of the Army--.

Signed and Sealed this

Third Day of August, 1993

Attest:

MICHAEL K. KIRK

Attesting Officer

Acting Commissioner of Patents and Trademarks